Figure 1:
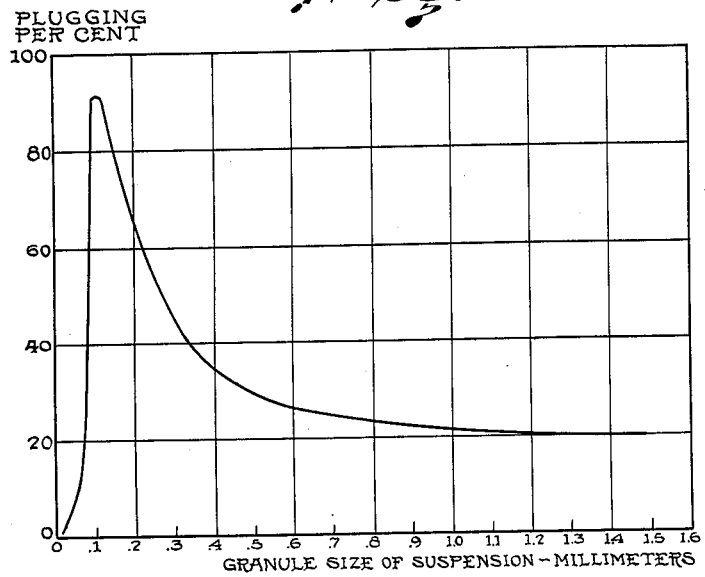

Dec. 21, 1943.  H. T. KENNEDY  2,337,295

TREATING OIL AND GAS WELLS FOR IMPROVEMENT OF PRODUCTION THEREFROM

Filed July 9, 1940

Inventor
Harvey T. Kennedy,
By A. M. Houghton
His Attorney

Patented Dec. 21, 1943

2,337,295

UNITED STATES PATENT OFFICE 2,337,295

TREATING OIL AND GAS WELLS FOR IMPROVEMENT OF PRODUCTION THEREFROM

Harvey T. Kennedy, Oakmont, Pa., assignor to Gulf Research & Development Company, Pittsburgh, Pa., a corporation of Delaware Application July 9, 1940, Serial No. 344,589

2 Claims. (Cl. 166—22)

This invention or discovery relates to improvements in treating oil and gas wells for improvement of production therefrom; and it comprises in a well treating method wherein acid or other solvent liquid is injected into the well and thence into the adjacent rock formations to enhance the productivity of said well, the step of injecting into the well in liquid suspension a collection of discrete particles of a material insoluble in the suspending liquid and solvent and of such controlled size as to cause a substantial but less than total reduction in the intake capacity of the well; all as more fully hereinafter set forth and as claimed.

Acid treatment of the producing formations of oil wells for increasing production therefrom has come into widespread use. The treatment involves injecting a suitable acid, say 15 per cent aqueous hydrochloric acid, into the well and into the surrounding rock. Heavy pressures are used. The acid penetrates into the pay formation and dissolves the rock, or at least enlarges the pores, if it is limestone; or leaches out the calcareous cementing material of limey sands. The net result is to enlarge the fluid-carrying channels and pores and thereby to increase the production of oil. Other solvents are sometimes employed, for dissolving the rock itself or clogging deposits in the rock pores.

Investigations involving the setting of packers at different levels in many oil wells producing large amounts of water have shown that in a great majority of cases the bulk of water enters the well through portions of the pay which have very high fluid-producing capacities, and this is particularly true in wells that have been heavily acidized. In some of these wells small amounts of water were produced early in the life of the well, and acid treatment increased the water flow along with an increase in oil production. In other cases, water entry into the wells followed immediately after acid treatment while in still others, no water was produced before acid treatment or for many months thereafter, but when water finally entered the wells, it was found to be through the sections which had received the bulk of the acid. Other parts of the pay formation in the same wells were found to have much lower fluid producing capacity and to produce water-free oil.

It is a desideratum in the art to keep the injected acid out of the large channels, where it does only harm, and at the same time direct it to the smaller channels, where its solvent action is desired. Attempts to treat predetermined portions of a pay formation by means of double packers or gel supports have had limited success because the loose and tight streaks occur at various levels of a pay formation, sometimes in alternation, and in general cannot be protected from or exposed to the action of acid by any practical means hitherto disclosed. The mere location of these streaks involves a tedious process of multiple packer settings with production tests at each setting. The expense of this investigation frequently amounts to several times the cost of ordinary acid treatment.

Similar difficulties are present in attempts made by the prior art to increase oil production from oil wells which have formations delivering gas to the well; and to attempt to increase gas production from gas wells which have highly permeable water sands lying below the gas formation.

Among the objects of the present invention are the provision of a method of solvent-treating wells, in which steps are taken to obstruct flow of solvent into coarse rock channels and to confine the solvent to finer rock channels, with the aid of suspended particles of controlled size, and the provision of such a method in which selective direction of solvent into smaller rock channels is accomplished without setting packers or other measurements carried out in the well itself.

These and other objects are achieved by the provision of a step, in acid treatment, of introducing into the well, in suspension in the acid or as a separate charge, a collection of discrete granular particles of predetermined size to obstruct the coarser rock channels, the proper size being determined by trying progressively smaller particles until the injection pressure and flow rate, as measured at the top of the well, shows that the coarser channels are substantially obstructed, confinement of the acid, etc. to the smaller channels is afforded, by operating steps which require no direct knowledge of the stratigraphy of the rocks adjacent the bore.

The results obtained by practice of the invention are remarkable. As compared with ordinary acid treatment, greater increases in well productivity are obtained, and the decline in production following treatment is much more gradual than with prior methods. When applied to wells making water the increase (if any) in water flow compared to the increase in oil flow is much less than with the usual acid treatments. And for a constant daily production of oil (water-free oil) before and after the treatment, the daily water production is substantially reduced. The chance of a well making water immediately as a result of acid treatment is materially reduced, and new wells, opened up by the method of the present invention, produce water-free oil for a longer time. Wells in limestone fields are usually abandoned because of excessive water production rather than because of diminished oil productivity. Practice of the present method increases the total oil recovery from such fields before they are abandoned.

A variety of materials can be used for the granules of the present invention. In general granules which are more or less the same in all dimensions are better than such things as thin flakes or long fibers. The granules employed are of such character as to remain separate in suspension without clumping, coalescence or smearing, so that they are readily filtered out upon flow of suspension thereof against permeable rock of pore size smaller than the granules. The particles are inert to acid, or at least not disintegrated into smaller particles by acid, and it is desirable that they should have approximately the same specific gravity as the suspending medium. The particle size which is most effective varies from field to field, and occasionally from well to well, although it is generally feasible to treat large numbers of nearby wells with the same type and size of suspended material. Excellent results are obtained employing for the suspended granules graded flaxseed meal, sawdust, Cellophane scrap (nodules), or hay or cornstalks cut to size; when very fine grain-size particles are needed, mineral particles such as pulverized barytes are useful.

The best materials are those which are hard enough to pack against the wall of the hole or in the pores in a loose structure with large voids between the particles, rather than those which pack tightly and form a substantially impermeable mat. It is best to stop short of complete plugging of the coarse pores rather than to take a chance on partly obstructing the oil formation. The amount of material put in the well depends on several factors, the first among them being the amount of pay section exposed. Ordinarily, only small amounts of the plugging material are required, sufficient to form a thin slurry with the suspending fluid. If too much is added the plugging material may build up in the hole and cause complete plugging and if too little is added the large pores are not effectively stopped and an excessive quantity of acid leaks away through them.

The present process can be carried out at almost no additional complication over ordinary acid treatment. It is unnecessary to pump plugging particles through the pump as a suitable pressure can be applied to the loading liquid after the plugging suspension is in the well. In case of wells with high surface pressure, the suspension of plugging material may be "lubricated" in using equipment available at most oil or gas wells. No additional apparatus is required and suitable materials are available near almost any oil field.

In order to determine the size of particle suitable to a given producing formation, it is generally necessary to perform some trials since the optimum size for one group of wells may have little significance in fields where widely different reservoir conditions are found. If no information is available, it is best to carry out one or more "dummy" injections using particles suspended in water rather than in acid, for ascertaining the optimum granule size, a typical or illustrative procedure being as follows:

Into a thousand gallons of water, mix 50 pounds of cotton seed hulls, chopped corn stalks or similar material, the particles being 0.25 to 0.50 inch in average diameter with the finer particles sieved out. Pump this mixture into the well through tubing, and continue pumping after the particles have reached the bottom. If the intake capacity of the well (volume of suspension pumped per minute, per pound differential pressure between the bottom hole and the formation) has decreased substantially, say, by 80 to 90 per cent, follow the plugging charge with acid for acid-treatment in the usual way.

If the intake capacity of the well is not decreased to the above extent, remove the plugging particles by bailing or other means, and repeat the treatment with a smaller size, about 0.1 to 0.25 inch in average diameter. From the injection pressures after the plugging material is in place again calculate the well's intake capacity and if it has been decreased 80 to 90 per cent proceed with the acid treatment.

If the intake capacity is not decreased as above, proceed with plugging, using particles each time about one-half the size used in the previous trial. Acid is injected after the desired decrease in well injection capacity is obtained.

If in any of the above trials the intake capacity of the well is decreased more than 30 per cent, it is desirable to proceed with the acid treatment unless the injection rates for acid are so slow that an unreasonable length of time is required to inject the required quantity of acid.

In treating certain exceptional wells, it is found that the desired degree of plugging is not obtained with any sizes of plugging particles provided for above. In these wells, however, it is noted that there is nothing to bail out after the 0.25 to 0.50 inch particles have been used, and this fact indicates that larger rather than smaller particles are required. In this case, the particle size is doubled rather than halved on each successive operation, and the intermediate bailing step can be eliminated.

It is, of course, unnecessary to experiment with every well as noted above. Wells in the same geological formation generally have similar requirements, and it is permissible to treat many wells in a field with plugging agents found to be effective on two or three wells. It is also desirable, after the requirements of a given group of wells is known, to dispense entirely with preliminary treatments in which the plugging material is suspended in water, and to add the plugging material directly to the acid before injection, thus eliminating another time-consuming step in the treatment. In some cases, examination of cores in a given region may be of assistance, although frequently large pores are known to exist and are not shown in the cores because of breakage of the core at the crevice.

The principles on which the invention is based are best illustrated by a consideration of controlled experiments on a laboratory scale in which underground conditions are duplicated as closely as present knowledge permits and where direct observation of operations at the face of a sample permeable rock formation is possible. My process is not limited in scope by the validity of the theories put forward to explain its action, but such theories have been found useful in selecting suitable materials and suitable size particles where some information in regard to underground conditions was available.

When a liquid suspension of solid, more or less rigid particles of about the same size in all dimensions is forced against a permeable sand bed or the like, any of three things may happen depending primarily on the relative size of the particles and the pores of the permeable bed. The liquid with its suspended particles may pass through the bed without change, if the particles are sufficiently small. Or the suspended particles may concentrate on the surface of the bed and cut down or stop the flow of liquid therethrough. Or the particles if relatively large may concentrate on the surface of the bed with little effect on the flow of the liquid. The present invention involves selecting particles of such size as to achieve the second result described. Pores of a given size are plugged without greatly affecting finer or coarser pores. As it is usually desirable to plug all pores coarser than those into which treatment fluid is to be injected, I often incorporate particles of a range of sizes such as to plug all such coarse pores.

In the accompanying drawing certain principles on which the invention is based are illustrated by charts. In the drawing Fig. 1 is a chart illustrative of the pore-plugging ability of a suspension of granules, for a given sand, as a function of granule size and Fig. 2 is a similar chart illustrative of the pore-plugging ability of a suspension of granules with regard to two adjacent sands, one fine and the other coarse.

Referring to Fig. 1, a bed of coarse sand was taken, of size passing a 10-mesh (to the inch) sieve and retained by a 20-mesh sieve; viz., wire sieves with square openings 2.0 millimeters and 0.84 millimeter across, respectively. The normal flow rate through the sand bed was determined by causing flow of water therethrough under constant head for a half hour or so, to establish constant conditions, and measuring the effluent flow rate. Then a suitable quantity of particles of the character described were introduced into the water flow to determine their flow obstructing effect. The ratio of the resulting reduction in flow rate to the original flow rate was taken as a measure of the plugging effect. Values of this ratio expressed as per cent values form the ordinates in the figure while the abscissae represent particle size of the plugging material. In these particular tests, finely divided silica (opalite) in pulverulent form was employed for the finest particles (below about 0.04 mm. average particle size) barium sulfate for the medium particles (0.04 to 0.15 mm.) and sand for the coarse particles (larger than 0.15 mm.).

From the figure it is observed that particles smaller than 0.05 mm. have only a minor plugging effect because particles of this size are not retained on the surface of the sand. They flow through the sand. With increasing particle size increased plugging results, until with particle size of 0.1 mm. a maximum plugging is obtained. Above 0.1 mm. the percentage of plugging decreases rapidly because the suspended particles, although substantially all of them bridge on the top of the sand, become increasingly permeable and their plugging effect correspondingly less. The average particle size of the 10–20 mesh sand is 1.6 mm., and if perfect packing and spherical grains are assumed the average pore size is 0.24 mm. The best plugging was therefore obtained in this example with particles about 40 per cent of the average size of the pores to be plugged.

Figure 2:
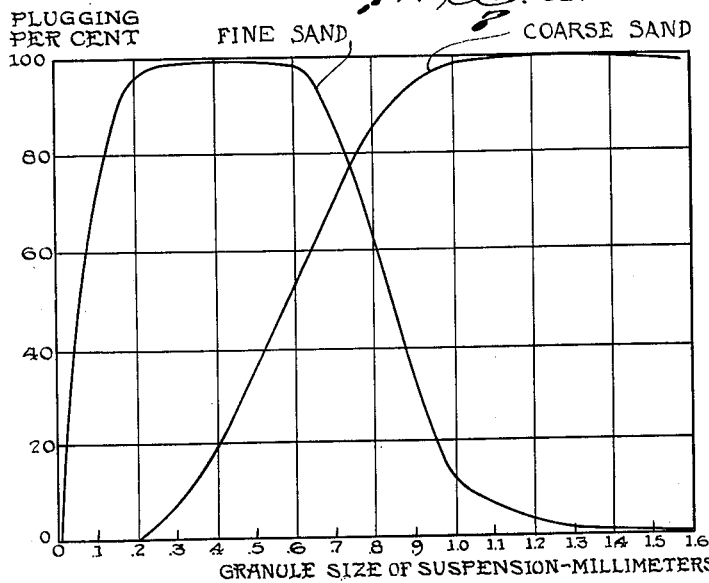

Referring now to Fig. 2 a comparable test was made with two sand beds, side by side but separated from each other, one fine and one coarse and exposed to the same flow of water at the same head. The sand of the finer sand bed passed a 20-mesh screen and was retained on a 48-mesh sieve while the coarser passed a 3-mesh and was retained on a 10-mesh sieve. Corresponding average grain sizes are 0.57 mm. and 4.34 mm. It will be observed that for the finer plugging material there is no plugging on either sand, this very fine material passing entirely through both sands. When material passing 200-mesh sieve and retained on 325-mesh sieve (average particle size 0.59 mm.) is used as a plugging material the fine sand is plugged to the extent of 60 per cent, whereas the coarse sand is still unaffected because the openings between the sand grains are much larger than the plugging particle. In the test, very fine silica powder was used for the smallest particles (about 0.02 mm. average particle size), barium sulfate for particles of size about 0.06 mm. and flaxseed meal for the larger particles. Flaxseed meal passing a 60-mesh sieve and retained on 80-mesh (average particle size 0.21 mm.) causes no plugging of the coarse sand, but brings about 98 per cent plugging on the finer sand. Flaxseed meal passing 20-mesh and caught on 40-mesh (average particle size 0.63 mm.) causes 99 per cent plugging of the finer sand and 55 per cent plugging of the coarser. When the size of the flaxseed particles is still further increased to about 1 mm. in diameter the plugging on the finer sand drops to 12 per cent whereas the plugging on the coarser sand increases to 99 per cent. When flaxseed particles of average diameter 1.4 mm. are employed no measurable effect is obtained on the finer sand whereas 99 per cent effectiveness persists in the case of the coarse sand.

The pore size of permeable water-bearing or other non-productive formations which it is desired to plug temporarily by my method varies of course over a considerable range. In many acid treatment situations the pore size of the non-productive sands corresponds to that of a bed of 3 to 10-mesh sand.

In an example illustrative of one mode of carrying out the invention in the acid treatment of an oil well for increasing production, cores taken from the producing region indicate the existence of an oil-bearing limestone of pore size averaging about 0.08 mm. with a number of streaks of average pore size 0.60 to 0.75 mm. There is made up a 500-gallon batch of inhibited 15 per cent hydrochloric acid, and there is admixed with the acid 50 pounds of sawdust of which grains finer than 0.24 mm. and coarser than 1 mm. have been screened out. The suspension is injected into the well in the usual procedure for acid-treating, and after application of pressure for a sufficient length of time to cause extensive penetration of the acid into the rock, pressure is released and the spent acid pumped out. On resuming production, oil production is substantially greater than is the case with nearby wells similarly treated but with plain acid, and no water was encountered after the acidization, as was frequently the case in this locality.

In another illustrative example of the acid treatment of an oil well, it is desired to acid treat a well which is making a substantial amount of water. No cores or other source of information as to the location and pore size of the water and oil formations is available. Accordingly there is first injected into the well a batch of 500 gallons of a water suspension of chopped corn stalks, in which the pieces of cornstalk are roughly cylindrical and of maximum diameter and length of about one inch. Pressure is applied. The high flow rate and low input pressure indicate that the water formation is not being effectively plugged. The cornstalk suspension is bailed out or otherwise removed and replaced with a suspension of cornstalks, the particle size of which is 0.5 inch diameter. The new suspension is injected into the well, and pressure is applied. The injection pressure is higher than in the first case, but is still rather lower than would be expected were the acid going only into an oil-bearing formation, so the particle size of the suspension is further reduced to 0.3 inch. This causes the injection pressure to rise sharply, and the intake capacity to decrease 35 per cent and it is considered that the correct particle size has been found.

In the next step a conventional well treating acid is injected in a known way, and spent acid is removed in due course. On resuming production it is found that the oil production is substantially increased but the water production is not increased.

In each example, on resuming production any plugging granules on the producing formation face are mostly dislodged by the reverse flow (flow into the well) and are discharged from the well in the first stages of production.

The invention is applicable to any of the usual acids employed in treating wells, including hydrofluoric acid, sulfuric acid, etc. as well as hydrochloric acid, and also to other solvent fluids injected into well formations to act on the rock or on deposits in the rock pores for the ultimate purpose of increasing production, including various paraffin solvents (benzol, etc.), chlorine gas, etc. While the invention avoids the necessity of employing gel columns or packers to aid in localizing treatment it can be practiced in conjunction with such treatments if desired.

What I claim is:

1. In well treatment processes wherein a thin, penetrating type solvent treatment fluid is injected into permeable rock formations surrounding well bores to enhance the productivity thereof, the improvement which comprises injecting into the well in liquid suspension a collection of coarse discrete particles of filtrable type under pressure and free of unfiltrable bodies and measuring the intake capacity of the well during the injection, repeating said operations with particles of progressively smaller average granule size until the measured intake capacity drops approximately 80 to 90 per cent and then injecting solvent treatment fluid into the well and formations.

2. In well treatment processes wherein a thin, penetrating type solvent treatment liquid is injected into permeable rock formations surrounding well bores to enhance the productivity thereof, the improvement which comprises injecting into a well in liquid suspension a collection of coarse discrete particles of filterable type under pressure and free of unfilterable bodies, measuring the intake capacity of the well during the injection, repeating said operations with particles of progressively smaller average granule size until the measured intake capacity drops approximately 80 to 90 per cent, thereafter utilizing particles of the determined granule size for treating other wells which penetrate the same geological formation as said first well, and injecting solvent treatment fluid into the wells so treated.

HARVEY T. KENNEDY.